United States Patent
Guthrie et al.

(10) Patent No.: US 7,374,621 B2
(45) Date of Patent: May 20, 2008

(54) SYSTEM AND METHOD FOR CLEANING CHEMISTRY AND PROCESSING DURING THIN FILM MAGNETIC HEAD WAFER FABRICATION

(75) Inventors: Hung-Chin Guthrie, Saratoga, CA (US); Ming Jiang, San Jose, CA (US); Nick Lara, Gilroy, CA (US); John Jaekoyun Yang, San Ramon, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 66 days.

(21) Appl. No.: 11/350,643

(22) Filed: Feb. 9, 2006

(65) Prior Publication Data

US 2007/0181151 A1 Aug. 9, 2007

(51) Int. Cl.
*B08B 7/04* (2006.01)

(52) U.S. Cl. .............. 134/6; 134/34; 134/36; 134/42; 134/902; 510/175; 510/434; 510/461; 510/477

(58) Field of Classification Search .......... 510/175, 510/477, 434, 461; 134/6, 34, 36, 42, 902
See application file for complete search history.

(56) References Cited

U.S. PATENT DOCUMENTS

| | | | |
|---|---|---|---|
| 5,662,769 | A | 9/1997 | Schonauer et al. |
| 6,123,088 | A | 9/2000 | Ho |
| 6,274,059 | B1 | 8/2001 | Krusell et al. |
| 6,303,551 | B1 | 10/2001 | Li et al. |
| 6,443,814 | B1 | 9/2002 | Miller et al. |
| 6,492,308 | B1 | 12/2002 | Naghshineh et al. |
| 6,531,436 | B1 * | 3/2003 | Sahbari et al. .............. 510/176 |
| 6,579,798 | B2 | 6/2003 | Chatterjee et al. |
| 6,806,193 | B2 | 10/2004 | Korthuis et al. |
| 6,858,124 | B2 | 2/2005 | Zazzera et al. |
| 6,984,613 | B1 * | 1/2006 | Guthrie et al. .............. 510/175 |
| 2003/0089891 | A1 | 5/2003 | Andreas |
| 2004/0106531 | A1 | 6/2004 | Kanno et al. |
| 2004/0161933 | A1 | 8/2004 | Takashima et al. |
| 2004/0259352 | A1 | 12/2004 | Leng et al. |
| 2004/0266185 | A1 | 12/2004 | Doke et al. |
| 2006/0042173 | A1 * | 3/2006 | Guthrie et al. ............... 51/309 |
| 2007/0181151 | A1 * | 8/2007 | Guthrie et al. ................. 134/6 |

FOREIGN PATENT DOCUMENTS

| | | |
|---|---|---|
| GB | 2323850 A | 10/1998 |
| TW | 546727 | 8/2003 |

OTHER PUBLICATIONS

Yi-Koan Hong, Dae-Hong Eom, & Jin-Goo Park, "Effect of Additives in Post Cu CMP Cleaning Solutions on Particle Adhesion and Removal", Metallurgy and Materials Engineering, Hanyang University, Ansan, Korea, Oct. 13, 2003, from http://user.chollian.net/~jhonny/ecs2003.pdf, 26 pages.

* cited by examiner

*Primary Examiner*—Sharidan Carrillo
(74) *Attorney, Agent, or Firm*—Bracewell & Giuliani LLP

(57) ABSTRACT

A solution of ammonium citrate and benzotriazole (BTA) is used to clean thin film magnetic head wafers. When used with brushing, the solution is a highly efficient process for removing particles, such as those generated during chemical-mechanical polishing (CMP), without causing corrosion and roughness. This process may be used on all CMP layers in thin film magnetic head wafer fabrication.

17 Claims, 2 Drawing Sheets

SYSTEM AND METHOD FOR CLEANING CHEMISTRY AND PROCESSING DURING THIN FILM MAGNETIC HEAD WAFER FABRICATION

BACKGROUND OF THE INVENTION

1. Technical Field

The present invention relates in general to the wafers used to form thin film magnetic head and, in particular, to an improved system, method, and apparatus for processing and cleaning thin film magnetic head wafers after chemical-mechanical polishing each layer that forms such wafers.

2. Description of the Related Art

Chemical mechanical planarization or polishing (CMP) is used to remove unwanted topographical features to achieve a smooth and planar surface. CMP also achieves film target thickness in the fabrication of thin film magnetic head wafers. One example of CMP thin film magnetic recording head wafer processing includes an undercoat $Al_2O_3$ CMP (i.e., UC CMP), a first shield S1 $Al_2O_3$—NiFe CMP (i.e., S1 CMP), a sensor patterning hard bias CoPtCr and lead liftoff CMP (i.e., K CMP), a first pole P1 $Al_2O_3$—NiFe CMP (i.e., P1 CMP), a first pole extension P1P $Al_2O_3$—NiFe or CoNiFe/CoFe copper hard baked photoresist CMP (i.e., P1P CMP), a second pole P2 $Al_2O_3$—NiFe or CoNiFe/CoFe CMP (i.e., P2 CMP), and an overcoat $Al_2O_3$—Cu CMP (i.e., OC CMP).

After each CMP process step, the newly planarized surface layer must be cleaned (i.e., post-CMP cleaning) to remove particles, such as those generated during CMP. A number of specialized cleaning methods and processes have been designed and used, but are limited to specific types of layers and materials. Thus, combinations of these solutions must be used depending on the layer types. As a result, a highly efficient, post-CMP cleaning solution and process would be desirable and is needed for removing particles without introducing defects to the wafer surface, such as causing corrosion and roughness. This process should be able to be used on all CMP layers and materials, such as NiFe, CoNiFe, CoFe, Cu, Ta, CoPtCr, DLC, $SiO_2$, $Al_2O_3$, and hard-baked photoresist, to remove particles without causing corrosion and roughness in thin film magnetic head wafer fabrication.

SUMMARY OF THE INVENTION

One embodiment of a system, method, and apparatus for cleaning thin film magnetic head (TFH) wafers utilizes a solution of ammonium citrate and benzotriazole (BTA). This solution is used in combination with brushing in a highly efficient process for removing particles, such as those generated during chemical-mechanical polishing (CMP), without causing corrosion, roughness, or scratching on the TFH wafer.

This process may be used on all CMP layers (e.g., the shields, sensor patterning layers, poles, and overcoats) used to form thin film magnetic head wafers during fabrication including, for example, undercoat $Al_2O_3$ CMP (i.e., UC CMP), first shield S1 $Al_2O_3$—NiFe CMP (i.e., S1 CMP), sensor patterning hard bias CoPtCr and lead liftoff CMP (i.e., K CMP), first pole P1 $Al_2O_3$—NiFe CMP (i.e., P1 CMP), first pole extension P1P $Al_2O_3$—NiFe or CoNiFe/CoFe copper hard baked photoresist CMP (i.e., P1P CMP), second pole P2 $Al_2O_3$—NiFe or CoNiFe/CoFe CMP (i.e., P2 CMP), and overcoat $Al_2O_3$—Cu CMP (i.e., OC CMP). These cleaning steps may be performed individually or simultaneously.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
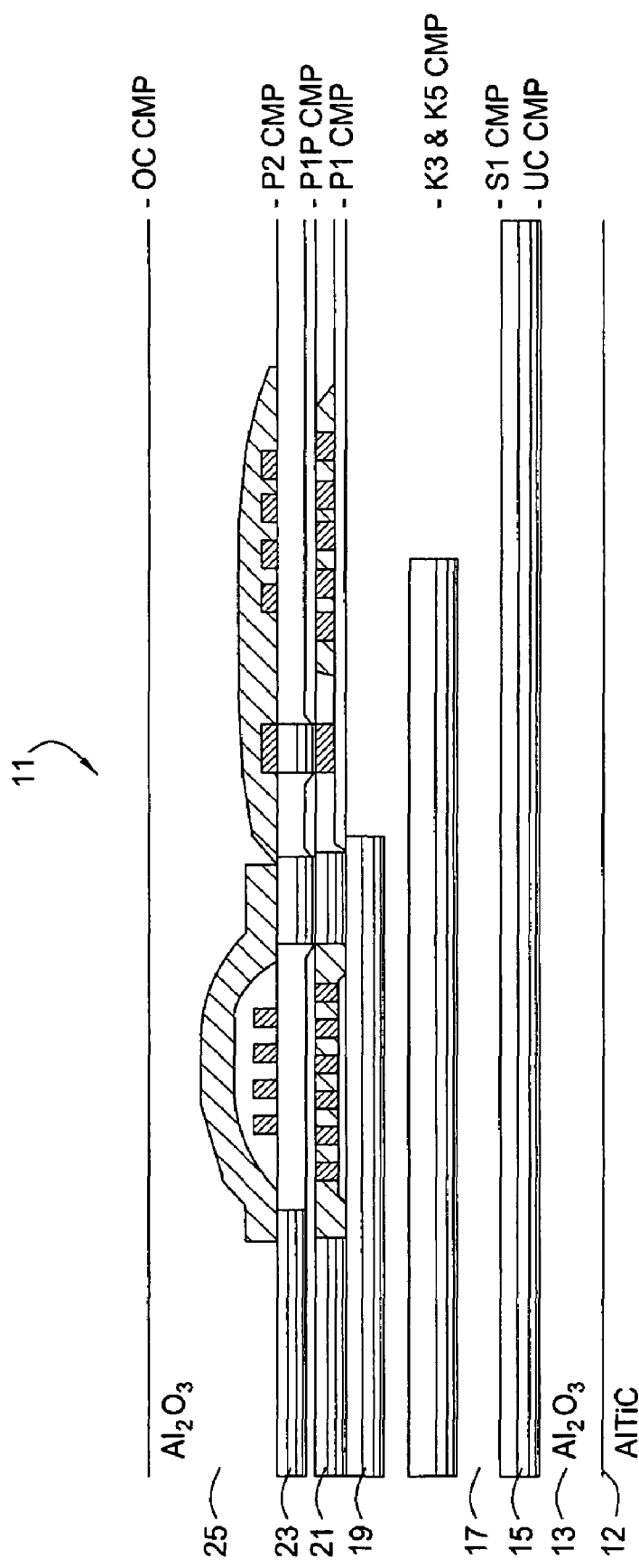
FIG. 1 is a schematic side view of one embodiment of TFH wafer constructed in accordance with the present invention.
Figure 2:
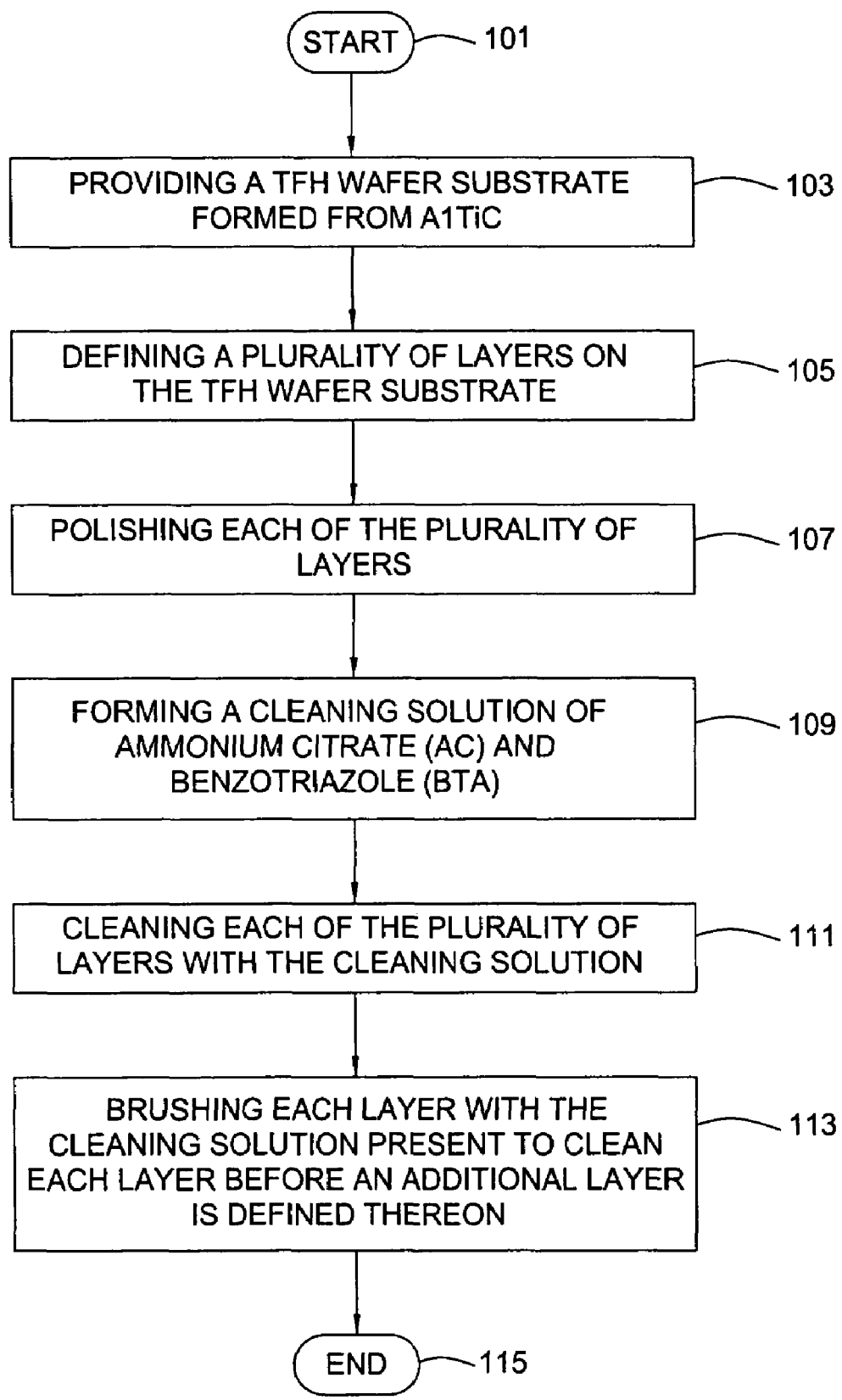
FIG. 2 is a high level flow diagram of one embodiment of a method constructed in accordance with the present invention.

Referring to FIGS. 1 and 2, one embodiment of a system and method for cleaning thin film magnetic recording head device (TFH) wafers 11 is disclosed. The present invention is specifically designed for thin film magnetic head wafers. The wafer substrate 12 for thin film magnetic head fabrication is typically AlTiC (e.g., $Al_2O_3$—TiC). A sputter-deposited $Al_2O_3$ is used for dielectric or insulating materials to match to the substrate material properties, especially the thermal extension property. Materials such as NiFe, CoNiFe, and CoFe are used as the magnetic shield and magnetic conducting pole materials. CoPtCr is used for the hard bias layer for the reader sensor. Copper is used for the electro-magnetic coil in the writer. Copper and NiFe are applied for the reader and writer electrical conductor pads.

In one embodiment, the CMP for wafer fabrication processing includes undercoat 13 $Al_2O_3$ CMP (UC CMP), first shield 15 S1 $Al_2O_3$—NiFe CMP (S1 CMP), sensor patterning 17 hard bias CoPtCr and lead liftoff CMP (K CMP), first pole 19 P1 $Al_2O_3$—NiFe CMP (P1 CMP), first pole extension 21 P1P $Al_2O_3$—NiFe or CoNiFe/CoFe copper hard baked photoresist CMP (P1P CMP), second pole 23 P2 $Al_2O_3$—NiFe or CoNiFe/CoFe CMP (P2 CMP), and overcoat 25. $Al_2O_3$—Cu CMP (OC CMP). Other embodiments may include additional layers, such as those illustrated in FIG. 1. In addition, high aspect ratio copper damascene coil process or copper damascene CMP for an advanced writer has been developed (Cu CMP and Ta CMP).

As shown in FIG. 2, the method starts as indicated at step 101, and comprises providing a TFH wafer substrate formed from AlTiC (step 103). A plurality of layers is defined on the TFH wafer substrate (step 105). For example, the layers formed on the TFH wafer substrate may include NiFe, CoFe, CoFeNi, CoPtCr, DLC, Cu, $Al_2O_3$, SiO2, Ta, and hard-baked photoresist. The process of the present invention may be used on all layers, individually or simultaneously, that are used to form thin film magnetic head wafers during fabrication.

After each layer is deposited, patterned, and refilled, each layer is polished and planarized (step 107), such as by CMP. This procedure and processing typically generates debris, such as particles, which must be removed prior to further processing of the TFH wafer during its fabrication. A cleaning solution of ammonium citrate (AC) and benzotriazole (BTA) is formed (step 109) to cleanse each processed layer of the TFH wafer as, for example, a post-CMP cleaning chemistry. This method, solution, and process is highly efficient for post-CMP cleaning (step 111) for all layers and materials described above to remove particles without introducing defects such as causing corrosion and roughness.

In one embodiment, the cleaning solution has an AC concentration of 0.1% by weight of cleaning solution, and has a pH of approximately 6.8. For example, the cleaning solution may be formed in the following proportions: 5 L of (34 g of AC in 10 L deionized water (DIW))+12 L of DIW. Post-CMP particle cleaning from AC is six times better than from hydrogen peroxide ($H2O2$). The average particle count from post-CMP cleaning is about 25 from AC, compared to about 150 from $H2O2$. In other embodiments, the AC is 0.1%, and the BTA is 0.05%, by weight, of cleaning solution; or the AC is 0.1%, and the BTA is 0.1%, by weight, of cleaning solution. All CMP layers and materials mentioned above, such as NiFe (e.g., NiFe 80/20, 45/55, 22/78), CoNiFe, Cu, CoPtCr, etc., can be cleaned to remove particles without causing corrosion and roughness.

In still another embodiment, the BTA in the cleaning solution may comprise 20% BTA and a surfactant. The BTA may be selected from, for example, 4-Methyl-1H-Benzotriazole (e.g., 3% concentration by weight); 5-Methyl-1H-Benzotriazole (e.g., 4% concentration by weight); Hydrogenated 4-Methyl-1H-Benzotriazole (e.g., 2.5% concentration by weight); or Hydrogenated 5-Methyl-1H-Benzotriazole (e.g., 3% concentration by weight). The BTA may be in a range of 0.0001% to 1% by weight of cleaning solution, or, in one embodiment, the BTA may be in a range of 0.05% to 0.1% by weight of cleaning solution.

The method further comprises cleaning each of the plurality of layers with the cleaning solution. The cleaning solution of the present invention is capable of cleaning all of the different types of materials mentioned above used to form thin film magnetic head wafers. In contrast, prior art solutions are only capable of cleaning just two or three materials such as Cu and SiO2, or Ta and SiO2 in CMP for semiconductor wafers. One embodiment of a method of the present invention (step 113) includes high pressure spraying and PVA brush scrubbing each layer of the TFH wafer with the cleaning solution present to clean each layer before an additional layer is defined thereon. The method ends as indicated at step 115 in FIG. 2.

While the invention has been shown or described in only some of its forms, it should be apparent to those skilled in the art that it is not so limited, but is susceptible to various changes without departing from the scope of the invention.

What is claimed is:

1. A method of cleaning a thin film magnetic recording head (TFH) wafer, comprising:
   (a) providing a TFH wafer substrate formed from AlTiC;
   (b) sequentially defining a plurality of layers on the TFH wafer substrate;
   (c) polishing each of the plurality of layers before an additional layer is formed thereon;
   (d) forming a cleaning solution consisting of ammonium citrate (AC), benzotriazole (BTA), a surfactant, and water; and
   (e) cleaning and brushing each of the plurality of layers with the cleaning solution before an additional layer is formed thereon.

2. A method according to claim 1, wherein step (b) includes defining the following layers: undercoat $Al_2O_3$ CMP (UC CMP), first shield S1 $Al_2O_3$-NiFe CMP (S1 CMP), sensor patterning hard bias CoPtCr and lead liftoff CMP (K CMP), first pole P1 $Al_2O_3$-NiFe CMP (P1 CMP), first pole extension P1 P $Al_2O_3$-NiFe or CoNiFe/CoFe copper hard baked photoresist CMP (P1 P CMP), second pole P2 $Al_2O_3$-NiFe or CoNiFe/CoFe CMP (P2 CMP), and overcoat $Al_2O_3$-Cu CMP (OC CMP); and
   step (e) is a post-CMP cleaning chemistry.

3. A method according to claim 1, wherein the AC concentration is 0.1% by weight of cleaning solution, and the cleaning solution has a pH of approximately 6.8.

4. A method according to claim 1, wherein the AC is 0.1%, and the BTA is 0.05%, by weight, of cleaning solution.

5. A method according to claim 1, wherein the AC is 0.1%, and the BTA is 0.1%, by weight, of cleaning solution.

6. A method according to claim 1, wherein the BTA is in a range of 0.0001% to 1% by weight of cleaning solution.

7. A method according to claim 1, wherein the BTA is in a range of 0.05% to 0.1% by weight of cleaning solution.

8. A method according to claim 1, wherein step (e) uses PVA brush scrubbing.

9. A method according to claim 1, wherein the BTA consists of a BTA solution consisting of 20% BTA by weight and the surfactant.

10. A method according to claim 1, wherein the BTA is selected from the group consisting of: 4-Methyl-1H-Benzotriazole, 5-Methyl-1 H-Benzotriazole, Hydrogenated 4-Methyl-1H-Benzotriazole, and Hydrogenated 5-Methyl-1H-Benzotriazole.

11. A method according to claim 3, wherein the cleaning solution is formed in the following proportions:
   5 L of (34 g of AC in 10 L deionized water (DIW)) +12 L of DIW.

12. A method according to claim 10, wherein the 4-Methyl-1H-Benzotriazole is 3% concentration by weight of the cleaning solution, the 5-Methyl-1H-Benzotriazole is 4% concentration by weight of the cleaning solution, the Hydrogenated 4-Methyl-1H-Benzotriazole is 2.5% concentration by weight of the cleaning solution, and the Hydrogenated 5-Methyl-1H-Benzotriazole is 3% concentration by weight of the cleaning solution.

13. A method of cleaning a thin film magnetic recording head (TFH) wafer, comprising:
   (a) providing a TFH wafer substrate formed from AlTiC;
   (b) defining a plurality of layers on the TFH wafer substrate, including undercoat $Al_2O_3$ CMP (UC CMP), first shield S1 $Al_2O_3$-NiFe CMP (S1 CMP), sensor patterning hard bias CoPtCr and lead liftoff CMP (K CMP), first pole P1 $Al_2O_3$-NiFe CMP (P1 CMP), first pole extension P1P $Al_2O_3$-NiFe or CoNiFe/CoFe copper hard baked photoresist CMP (P1P CMP), second pole P2 $Al_2O_3$-NiFe or CoNiFe/CoFe CMP (P2 CMP), and overcoat $Al_2O_3$-Cu CMP (OC CMP);
   (c) chemical mechanical polishing each of the plurality of layers before an additional layer is formed thereon;
   (d) forming a cleaning solution consisting of ammonium citrate (AC), benzotriazole (BTA), a surfactant, and water; and (e) cleaning and brushing each of the plurality of layers with the cleaning solution before an additional layer is formed thereon.

14. A method according to claim 13, wherein the AC concentration is 0.1% by weight of cleaning solution, and the cleaning solution has a pH of approximately 6.8.

15. A method according to claim 13, wherein the BTA consists of a BTA solution consisting of 20% BTA by weight and the surfactant.

16. A method according to claim 13, wherein the BTA is selected from the group consisting of: 4-Methyl-1H-Benzotriazole at 3% concentration by weight of the cleaning solution, 5-Methyl-1H-Benzotriazole at 4% concentration by weight of the cleaning solution, Hydrogenated 4-Methyl-1H-Benzotriazole at 2.5% concentration by weight of the cleaning solution, and Hydrogenated 5-Methyl-1H-Benzotriazole at 3% concentration by weight of the cleaning solution.

17. A method according to claim 14, wherein the cleaning solution is formed in the following proportions:

5 L of (34 g of AC in 10 L deionized water (DIW)) +12 L of DIW.

* * * * *

UNITED STATES PATENT AND TRADEMARK OFFICE
CERTIFICATE OF CORRECTION

PATENT NO. : 7,374,621 B2
APPLICATION NO. : 11/350643
DATED : May 20, 2008
INVENTOR(S) : Hung-Chin Guthrie et al.

It is certified that error appears in the above-identified patent and that said Letters Patent is hereby corrected as shown below:

Col. 4, Ln. 11 and 12: replace "P1 P" with --P1P--
Col. 4, Ln. 43: insert --BTA is selected from the group consisting of:-- between "wherein the" and "4-Me-"
Col. 5, Ln. 10 and 11: delete "BTA is selected from the group consisting of:"

Signed and Sealed this

Twelfth Day of August, 2008

JON W. DUDAS
*Director of the United States Patent and Trademark Office*